W. H. COLDWELL.
MOTOR LAWN MOWER AND ROLLER.
APPLICATION FILED FEB. 14, 1911.
1,048,499.
Patented Dec. 31, 1912.
2 SHEETS—SHEET 1.
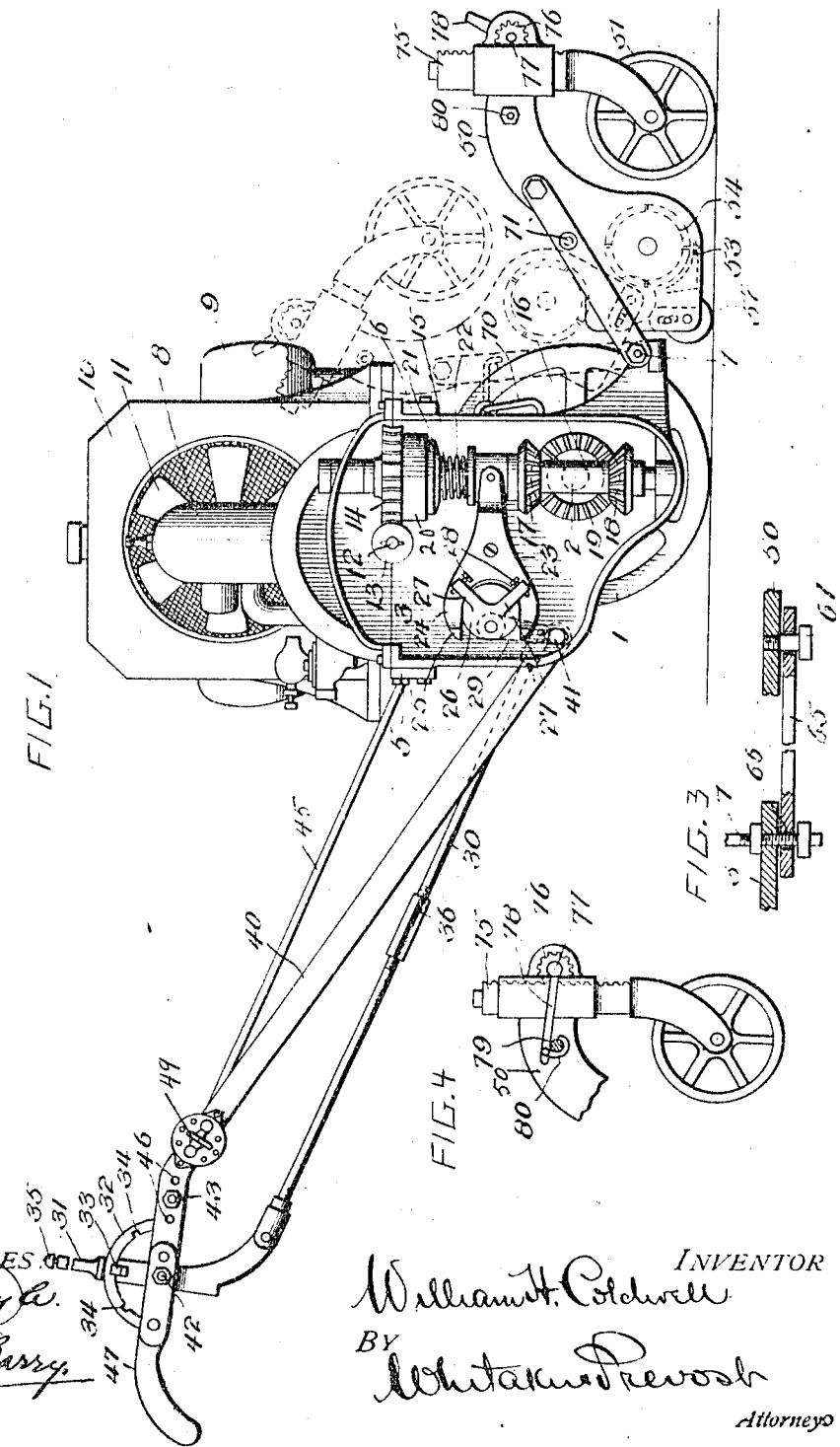
WITNESSES
Wm. F. Koyle
R. E. Barry
INVENTOR
William H. Coldwell
BY
Whitaker Prevost
Attorneys

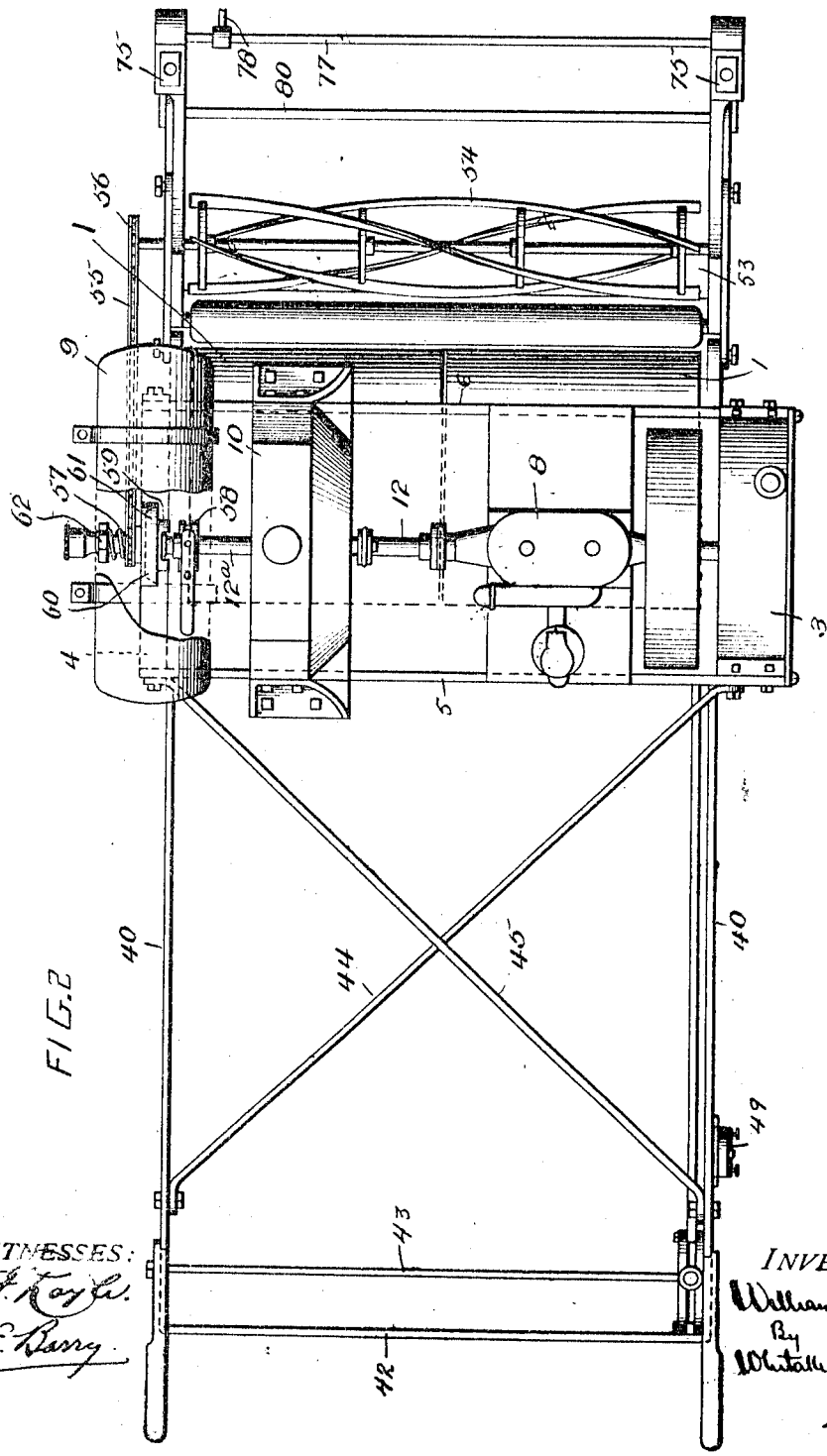

UNITED STATES PATENT OFFICE.

WILLIAM H. COLDWELL, OF NEWBURGH, NEW YORK.

MOTOR LAWN MOWER AND ROLLER.

1,048,499.  Specification of Letters Patent.  Patented Dec. 31, 1912.

Application filed February 14, 1911. Serial No. 608,549.

*To all whom it may concern:*

Be it known that I, WILLIAM H. COLDWELL, citizen of the United States, residing at Newburgh, in the county of Orange and State of New York, have invented certain new and useful Improvements in Motor Lawn Mowers and Rollers; and I do hereby declare the following to be a full, clear, and exact description of the invention, such as will enable others skilled in the art to which it appertains to make and use the same.

My invention consists in the novel features hereinafter described, reference being had to the accompanying drawings which illustrate an embodiment of the invention selected by me for purposes of illustration, and said invention is fully disclosed in the following description and claims.

Referring to the said drawings, Figure 1 represents a side elevation of a machine embodying my present invention. Fig. 2 is a top plan view of the same. Fig. 3 is a detail view of parts of the mechanism hereinafter fully described. Fig. 4 is another detail view of parts of the mechanism.

The object of my invention is to provide a compact and comparatively inexpensive machine actuated by power, for mowing grass on lawns, golf courses and the like and which can be employed if desired upon the putting greens as well as the fair greens, which can be equipped detachably with more than one style of mowing or other grass engaging device, and which can also be employed for rolling the lawn, golf fair greens or putting greens, tennis courts or other surfaces, by folding the grass engaging device upon the main frame of the apparatus, thereby adding the weight of the said device to that of the roller and connected parts.

To this end the machine comprises a combined traction device and roller constructed and arranged as set forth in a companion application for Letters Patent filed by me on the 14th day of February 1911, and given Serial No. 608,548 in combination with a frame provided with rotary ground engaging devices and a grass engaging device, said frame being connected detachably with the said traction device and roller, and in such manner as to secure the advantageous results herein set forth.

In setting forth my present invention I will first briefly describe the combined traction device and roller, which is not claimed *per se* herein, as it is claimed in my former application above referred to. 1 represents a roller (comprising one or more sections) mounted on the axle 2, upon which is mounted a motor carrying frame comprising the end plates 3, 4 and cross bars 5, 6 and 7. Upon the said frame is mounted a suitable motor, in this case an internal combustion engine 8, gasolene tank 9 and radiator 10 provided with the usual fan 11. 12 is the motor shaft which extends through side plate 3 and is provided with a worm 13, gearing with worm wheel 14 on a vertical shaft 15 mounted in the side plate and carrying a sleeve 16 which is provided with bevel pinions 17 and 18 adapted to engage a bevel gear 19 on axle 2. The bevel gears 17 and 18 are spaced apart sufficiently so that both may be simultaneously out of engagement with the bevel pinion 19 and by moving the sleeve 16 which is keyed to shaft 15, up or down either of said pinions 17 or 18 may be caused to mesh with the pinion 19, thus driving the roller 1 either forward or backward as the case may be. 20 and 21 are friction clutch members connecting the worm gearing with shaft 15, and held normally in engagement by spring 22. This clutch normally connects the motor with the shaft 15, but provides for slippage in starting to avoid strain on the gearing. The bevel pinions are shifted into and out of engagement with gear 19 by a shifting lever 23 pivoted to the side plate 3 and having arms 24, 24 which engage an eccentric 26. The eccentric is provided with stop arms 27, 27 carrying adjustable stops 28, 28 to engage stops 25, 25 on the arms 24, 24 to insure proper intermeshing of the pinions and bevel gear. The eccentric 26 is provided with an operating arm 29 connected by a link 30 with a hand lever mounted on the handle structure hereinafter described, adjacent to a segment 32 provided with notches 34 engaged by a pawl 33 carried by the hand lever and released by a spring actuated rod 35 in a well known way. 36 is a reversely threaded sleeve engaging reversely threaded ends of two sections of the link 30 for adjusting the link. 40, 40 represent handle bars pivoted to the main frame at 41, 41 and connected by cross rods 42, 43. 44, 45 are diagonal brace bars connected to the cross bar 5 of the main frame and adjustably to the handle bars by means of adjusting apertures 46 and 47, 47 are the hand engaging portions of the handles. 49 is a spark controller for the igniter mounted on the handle structure in easy reach of the operator. All the foregoing parts are constructed and operate substantially as described in my former application above referred to, and form what I term a combined traction device and roller, in which the entire weight of the apparatus is supported upon a roller or rollers having a single axis, and in the use of which the operator by means of the handles both steers the device and maintains the frame and motor in such relation with the roller as to enable the roller to carry the entire weight of the apparatus. By adjusting the handles up and down and correspondingly adjusting the link 30, the device is adapted to operators of different heights, so that their hands may engage the handles in a comfortable position. The torque of the engine in driving the roller reacts somewhat upon the frame and causes a reaction which tends to disturb the normal equilibrium, but this is overcome in the present apparatus, as hereinafter described, and generally it can be stated that the device can be adjusted to move the center of gravity forward or rearward to insure equilibrium by slightly raising or lowering the handles.

In front of the traction and lawn rolling roller 1 is a second frame 50 which carries the grass engaging devices, and is provided with its own supporting devices. In the embodiment of my invention herein shown, the frame 50 is provided at its forward end with the usual caster wheels 51, 51 adjustable vertically with respect to the frame 50 in the manner usual in lawn mowers. In this instance I have shown the shanks of the caster wheels 51 mounted in vertically sliding blocks 75 supported in the forward end of the side plates of frame 50, and provided with racks on their front faces engaged by pinions 76 on a rock shaft 77, and said shaft is provided with an operating arm 78 having a retaining device or latch 79 to engage a cross bar 80 of the frame 50 (see Fig. 4). Said frame 50 is provided at its rear end with a ground engaging roller 52, also preferably adjustable vertically with respect to the frame, to regulate the height of cut. The frame 50 is shown provided with the usual stationary knife bar 53, and rotary cutter 54 for cutting grass, but it may be provided with a rotary brush or other form of grass engaging device. The rotary grass engaging device is driven directly from the motor in this instance by means of a sprocket chain 55 engaging a sprocket wheel 56 on the shaft of said rotary device or cutter, and a sprocket wheel 57 on an extension 12$^a$ of the motor shaft 12. The shaft 12$^a$ is provided with a positive clutch member 58 movable longitudinally thereof into and out of engagement with a positive clutch member 59 which is connected with sprocket wheel 57 by a friction device comprising a friction cone 60, secured to clutch member engaging a female friction member 61, connected to the sprocket wheel 57, the said friction members being normally held in engagement by a spring 62, and serving to prevent permanent injury to the rotary cutter in case the latter is stopped by a stick or stone.

The cutter frame 50 is connected with the motor carrying frame by devices permitting said frames to rock transversely and longitudinally with respect to each other to enable the cutter frame to accommodate itself to the uneven surface of the ground in advance of and independently of the roller, to effect an even cut. In this instance I have shown links 65, 65 connecting said frames, said links being pivotally connected at their rear ends to collars 66 on the cross rod 7 and are held in place by nuts as shown in Fig. 3, while the forward ends of said links are pivotally connected to the frame 50 by shouldered screws 67, the holes in said links engaging the said collars being slightly greater than the diameter of the parts which they engage and the said collar and the shouldered portion of said screws being slightly longer than the thickness of said bars to provide the required amount of looseness in said connections to permit the independent rocking of said frame 50 with respect to the roller both longitudinally and transversely of the machine. The point of connection of said links with the motor carrying frame being below the level of their connection with the frame 50, the reaction in pushing the cutter frame when the device is in use will exert a downward pressure upon the front end of the motor frame, and this pressure will tend to counteract the torque of the engine in driving the roller, and facilitate balancing the motor frame upon the roller axle.

If it is desired to use the device as a roller without cutting the frame 50 can be raised into the position shown in dotted lines in Fig. 1, and locked in that position by any desired means, as by hooks 70 connected with the motor frame engaging headed studs 71 secured to the links 65 in position to receive said hooks. When the mower frame 50 is thus raised from the ground its weight will be added to the weight on the roller, and at the same time transferred rearwardly toward the axis of the roller, as the mower frame will be supported in nearly a vertical position above the cross bar 7. Should this throw too much weight forward of the axis of the roller, a slight lowering of the handles will enable the weight to be distributed as to secure substantial equilibrium of the device when in operation as a portion of the additional weight will be compensated for by the torque of the engine. In this condition the device can be used to roll fair greens, putting greens, lawns, tennis courts, etc.

If it is desired to substitute a frame 50 having a different form of grass engaging device, as a different style of cutting mechanism for special purposes, as in cutting putting greens, or a grass sweeper, the frame 50 can be detached by loosening screws 67, 67 and another similar frame 50 provided with the particular form of grass engaging device desired, can be attached to said links.

What I claim and desire to secure by Letters Patent is:—

1. In a motor lawn mower, the combination with a motor carrying frame provided with rotary traction and supporting devices having their axes in a single line extending transversely of the machine, and a handle secured to said frame for holding the frame in proper relation to the rotary traction devices to enable them to support substantially the entire weight of the frame, of a cutter frame arranged in advance of said rotary traction devices, and provided with independent rotary supporting devices, and yielding propelling connections between the motor frame and the cutter frame, whereby the motor frame may be tilted upon the axes of its traction and supporting devices without raising or lowering the cutter frame.

2. In a motor lawn mower, the combination with a motor carrying frame, combined traction and lawn rolling rollers having the axes thereof in a single line extending transversely of the machine, and a handle secured to said frame for balancing the weight thereof over the axes of said rollers, a separate frame in advance of the said rollers, provided with cutting mechanism and having its own independent rotary supporting devices, and links pivotally connected to each of said frames for propelling the cutter frame from the motor frame, the pivotal connections at opposite ends of said links being in different horizontal planes whereby the thrust upon said links will assist the operator in equilibrating the motor frame.

3. In a motor lawn mower, the combination with a motor carrying frame, combined traction and lawn rolling rollers having the axes thereof in a single line extending transversely of the machine, and a handle secured to said frame for balancing the weight thereof over the axes of said rollers, a separate frame in advance of the said rollers, provided with cutting mechanism and having its own independent rotary supporting devices, and links pivotally connected to each of said frames for propelling the cutter frame from the motor frame, the pivotal connections of said links with the motor frame being below the axis of the traction rollers and the pivotal connections of said links with the cutter frame being above the plane of the pivotal connections with the motor frame.

4. In a motor lawn mower, the combination with a motor carrying frame, combined traction and lawn rolling rollers having the axes thereof in a single line extending transversely of the machine, and a handle secured to said frame for balancing the weight thereof over the axes of said rollers, a separate frame in advance of the said rollers, provided with cutting mechanism and having its own independent rotary supporting devices, and links pivotally connected to each of said frames for propelling the cutter frame from the motor frame, and means for securing the cutter frame to the motor frame out of contact with the ground whereby the weight of the cutter frame is transferred to the motor frame and assists in resisting the torque of the motor, and in equilibrating the motor frame.

5. In a motor lawn mower, the combination with a motor carrying frame, combined traction and lawn rolling rollers having the axes thereof in a single line extending transversely of the machine, and a handle secured to said frame for balancing the weight thereof over the axes of said rollers, a separate frame in advance of the said rollers, provided with cutting mechanism and having its own independent rotary supporting devices, and links pivotally connected to each of said frames for propelling the cutter frame from the motor frame, the pivotal connections of said links with the motor frame being below the axis of the traction rollers and the pivotal connections of said links with the cutter frame being above the plane of the pivotal connections of the links with the motor frame and means for securing said links in substantially vertical position with the cutter frame free from the ground.

6. The combination with a motor frame provided with traction rollers having their axes in a single transverse line and supporting the entire weight of the frame, and a handle secured to the frame to enable the operator to balance the frame over the rollers, of a separate cutter frame, provided with its own independent rotary supporting devices, and propelling connections between said frames permitting them to rock independently of each other in directions longitudinally of the machine.

7. The combination with a motor frame provided with traction rollers having their axes in a single transverse line and supporting the entire weight of the frame, and a handle secured to the frame to enable the operator to balance the frame over the rollers, of a separate cutter frame, provided with its own independent rotary supporting devices and loose propelling connections from the motor frame to the cutter frame, constructed to permit the frames to rock transversely independently of each other.

In testimony whereof I affix my signature in the presence of two witnesses.

WILLIAM H. COLDWELL.

Witnesses:
J. K. MOORE,
R. E. BARRY.